July 26, 1960 K. R. WALCH ET AL 2,946,929
PANELBOARD WIRING SUPPORT ARRANGEMENT
Filed May 24, 1957
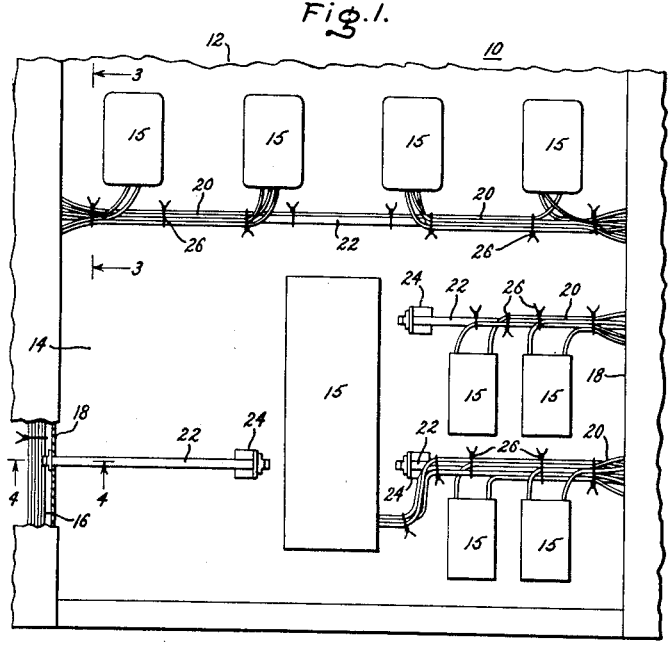
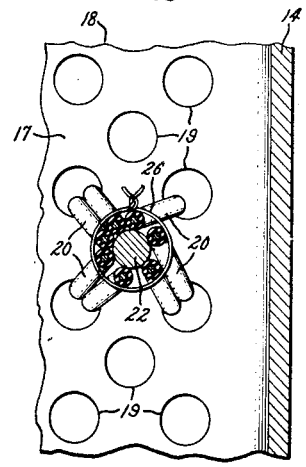
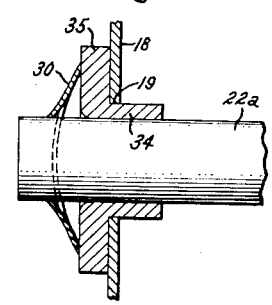
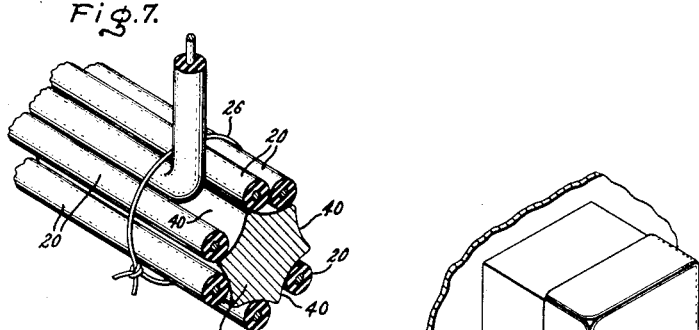
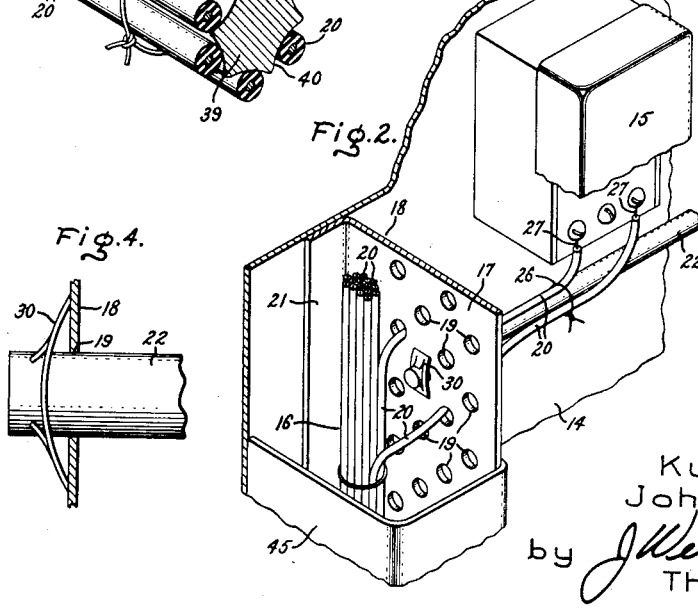
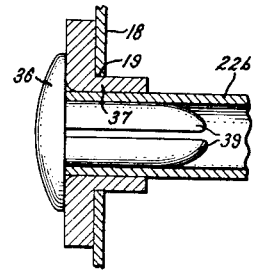
Inventors:
Kurt R. Walch,
John J. Winsness,
by J. Wesley Haubner
Their Attorney.

United States Patent Office 2,946,929
Patented July 26, 1960

2,946,929

PANELBOARD WIRING SUPPORT ARRANGEMENT

Kurt R. Walch, Philadelphia, and John J. Winsness, Havertown, Pa., assignors to General Electric Company, a corporation of New York Filed May 24, 1957, Ser. No. 661,530

7 Claims. (Cl. 317—122)

This invention relates to an arrangement for supporting the wires of an electric panelboard.

More specifically, the invention is concerned with the type of panelboard which utilizes wiring strips or grilles extending along the surface of the panelboard for supporting the major runs of panelboard wire. Generally, in such arrangements, the wiring strip extends along an edge of the panelboard, and the various electrical devices which are to be wired are located upon the surface of the panelboard off to one side of the strip. At suitable points spaced along the length of the wiring strip, appropriate individual wires of the wiring run are directed horizontally through openings in the wiring strip for electrical connection with the appropriate devices.

For supporting these wires which extend generally horizontally between the wiring strip and the various panelboard devices, it has heretofore been customary to utilize suitable wiring cleats, such as shown, for example, in U.S. Patent No. 2,682,384—Eichelberger, assigned to the assignee of the present invention. These wiring cleats are usually bolted or welded to the panelboard surface, and to locate them properly on the surface requires much planning and a considerable amount of drafting work. Moreover, once the cleats have been installed, the wiring arrangements cannot be readily changed. Usually, additional cleats are required for any new wiring arrangement, and this generally requires refinishing and repainting of the panel, which is a costly procedure.

It is therefore an object of our invention to provide a simple and inexpensive wire-supporting arrangement which can be properly installed without the extensive planning and drafting work heretofore required with wiring cleats.

Another object is to provide an improved wire-supporting arrangement which can be quickly installed and which readily lends itself to subsequent modifications to allow for changes in the wiring arrangement.

In carrying out our invention in one form, we provide a panel on which a plurality of electrical devices are mounted. A wiring-strip extending along the panel and having a body portion disposed perpendicular to the panel is utilized for supporting a major run of panelboard wire. The body portion of the wiring strip is provided with a plurality of apertures, and within one of these apertures a horizontally-extending wire-supporting rod is mounted. This wire-supporting rod projects from the strip into the region of one or more of the devices which is to be wired. Circuit wires from the major run are led through apertures in the strip and then run horizontally alongside the rod. These horizontally-extending wires are suitably anchored to the rod, and their terminals are appropriately connected to selected panelboard devices.

For a better understanding of our invention, reference may be had to the following specification taken in connection with the accompanying drawing, wherein:

Fig. 1 is an elevational view, partly in section, of the rear face of a panelboard embodying our invention.

Fig. 2 is a perspective view showing some of the details of the wire-supporting arrangement for the panelboard of Fig. 1.

Fig. 3 is a sectional view taken along the line 3—3 of Fig. 1.

Fig. 4 is a sectional view taken along the line 4—4 of Fig. 1.

Figs. 5, 6, and 7, respectively, show modified forms of our invention.

Referring now to Fig. 1, the illustrated panelboard 10 comprises a panel 12 having a vertically-extending mounting surface 14. Mounted on the panel 12 and projecting from the surface 14 are a plurality of electrical devices, such as meters, switches, fuses, or the like, designated 15.

To support the vertical runs 16 of wire which extend along the lateral edges of the panelboard, suitable vertically-extending wiring strips or grilles 18 are provided. As shown in Fig. 2, these wiring grilles 18 each comprise a body portion 17 having a large number of apertures 19 formed therein. The grille is supported on the panel surface 14 by means of a suitable foot 21, and its body portion 17 is disposed generally perpendicular to the mounting surface 14. The wires 20 which constitute the vertical run 16 are suitably bound together and anchored to the grille 18. Wiring grilles or strips of this general type for supporting vertical runs of circuit wires are well known, and reference may be had to U.S. Patent No. 2,006,150, Reed et al., assigned to the assignee of the present invention, for a more complete description of a typical grille of this type. Another example of a wiring strip which is suitable for this type of service is the grille described in application S.N. 538,626, filed on October 5, 1955, by K. R. Walch and also assigned to the assignee of the present invention.

At suitable vertically-spaced locations, individual wires are lead off from the vertical run 16 and are directed horizontally to the various panelboard devices 15 which are to be wired. For supporting these horizontally-directed lengths of wire, a plurality of horizontally-extending rods 22 are provided. These rods 22 project from one of the other of the grilles 18 into proximity with the appropriate devices. The upper rod 22 of Fig. 1 is shown extending over the entire distance between the two grilles 18, whereas the other rods extend only partially across the panelboard.

At least one end of each rod 22 is received in one of the apertures of a grille 18, where it is anchored against movement with respect to the grille in a suitable manner soon to be described. If a particular rod 22 extends across the entire width of the panel board, both of its ends are supported in the apertures of the two spaced-apart wiring grilles, and the rod is therefore located inwardly of the outer edges of the grilles. Preferably, these wiring grilles are substantially identical and are so located that their apertures are in alignment, so as to readily receive the rods 22 and locate them in planes generally parallel to the panel surface 14. For those rods 22 which extend only partially across the panelboard, suitable brackets 24 are provided for supporting the ends of the rods in locations spaced from the grilles. Preferably, these brackets 24 are of an L-shaped configuration and are formed with a plurality of apertures, individual ones of which are adapted to receive an appropriate rod 22.

As illustrated in Figs. 2 and 3, those circuit wires 20 which are supported on a particular rod 22 pass through adjacent apertures 19 in the grille 18 and extend alongside the rod. The wires are preferably distributed uniformly around the rod and are anchored to the rod by suitable means, such as for example the cord ties 26 shown. As shown in Fig. 2, the terminals 27 of the horizontally-extending wires are electrically connected to appropriate selected devices 15 in a suitable conventional manner.

By proper choice of the particular apertures 19 which are to receive the rods 22, the rods can be located at a distance from the panel surface 14 which most facilitates making of connections to the various devices 15.

The rods 22 can be anchored within the apertures 19 by means of fastening devices capable of being readily applied at high speed. For example, suitable speed nuts, such as shown at 30 in Figs. 2 and 4, can be slipped about opposite ends of the rod 20 and pressed into engagement with the walls of the grille 18 or bracket 24. The frictional holding action between each of the nuts 30 and the rod 22 acts to prevent lateral shifting of the rod with respect to the apertures 19.

For certain applications, it may be desirable to use wire-supporting rods which are smaller than the apertures 19 of the wiring grille. Fig. 5 illustrates one manner in which this can be readily accomplished. A suitable tubular bushing 34 is slipped about the rod 22a and is snugly interposed between the aperture 19 and the rod 22a. A shoulder 35 provided on the bushing bears against the outer surface of the grille 18, and the speed nut 30 which is frictionally held on the rod 22a prevents the rod from shifting axially to the right with respect to the bushing 34. A corresponding fastening arrangement is used at the other end of the rod 22a to prevent the rod from shifting axially to the left. It will be apparent that the bushing acts to prevent radial movement of the rod 22a in the aperture 19.

Fig. 6 of the drawing shows another modification which differs from those previously-described by utilizing a wire-supporting rod 22b of tubular configuration. This tubular rod 22b is anchored against axial movement with respect to the adjacent wiring grille 18 by means of a headed fastening device 36 and a bushing 37 similar to the bushing of Fig. 5. The headed fastening device, which is of a conventional form, has a body portion comprising resilient segments 39 which tend to move radially-outward to grip the internal walls of the tubular rod 22b and thus anchor the fastening device within the rod. To assemble the rod 22b within the aperture 19, the bushing 37 is first positioned in the manner shown, after which the headed fastening device 36 is pressed into the tubular rod 22b, where it is frictionally anchored. A similar fastening arrangement is provided at the other end of the rod 22b to prevent the rod from shifting axially to the left with respect to its support.

Fig. 7 shows another modified form of wire-supporting rod, about which circuit wires 20 are fastened by suitable means such as the cord tie 26 encircling the wires and the rod. This rod, designated 39, is provided with axially-extending grooves 40 in its peripheral surface which aid in anchoring the wires 20 to the rod. These grooves 40 are adapted to receive wires of widely varying size, thus providing a relatively versatile wire-supporting structure. A special advantage of the wire-supporting rod 39 of Fig. 7 is that the grooves 40 coact with the fastening means 26 to effectively restrain the supported wires from shifting circumferentially about the rod. With a rod having a smooth periphery, it is possible for such shifting to take place as a result of panelboard vibrations. Such circumferential shifting tends to force all of the wires into a position beneath the rod, thus imposing an undue load on the cord 26 which is then required to support the weight of all of the wires. By precluding such circumferential shifting, the weight of the wires is carried primarily by the rod itself. This rod 39 is preferably anchored within an aperture 19 of the wiring grille 18 by means corresponding to that illustrated in Figs. 4 or 5.

It should be apparent that our wire-supporting arrangement requires very little planning or drafting work for its proper installation. In this regard, the panel-board wireman is provided with a typical electrical connection diagram, such as one showing the desired location of each horizontal wire run, and he is simply instructed to insert a suitable wire-supporting rod 22 through the apertures 19 of the grilles 18 in an appropriate location for supporting such horizontal wire run.

If it becomes necessary to modify the wiring arrangement, the wire-supporting rod can be readily removed from any particular location and reinstalled in any other desired location. For those rods which extend entirely across the panelboard, such changes can be readily effected without any material structural changes to the panelboard. All that is involved is shifting the rod 22 from one set of apertures 19 to another.

For those rods which have one end supported on a bracket 24, such changes involve relocation of only a single structural member (24) secured to the panelboard, whereas with the wiring cleats heretofore used, it has been necessary to relocate, or at least add, a large number of structural members to the panelboard surface. It is possible to minimize the need for shifting the location of even the single brackets 24 by utilizing brackets having a relatively large number of apertures. Such brackets are preferably formed from the same type of strip as the wiring grille 18, and like the grilles 18, are adapted to receive the rods 22 at varying locations without any need for relocaton of the bracket itself.

While we have described particular embodiments of our invention in which the mounting surface of the panelboard is vertically disposed, it should be apparent that the invention lends itself equally well to panelboards which have their mounting-surface horizontally or otherwise disposed.

It should also be apparent that the disclosed wire-supporting structure readily lends itself to use with wiring arrangements in which a bundle of wires (such as 16) is located on the same side of the grille 18 as the devices 15 being wired. In such cases, individual circuit wires would extend horizontally from the bundle 16 without passing through the apertures of the grille. In such an arrangement, as compared to the illustrated arrangement, it is somewhat more difficult to neatly cover the bundle of wires due to the presence of the wire-supporting rods. In the illustrated arrangement, it is a simple matter to apply a suitable cover to the wiring grille without interference from the rods, as is shown for example at 45 in Fig. 2.

It will be apparent to those skilled in the art that various other changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. In a panelboard comprising a panel having a mounting surface, at least one electrical device mounted on the panel and projecting from said surface, a wiring strip extending along said surface and having a body portion disposed generally perpendicular to said surface, said body portion containing a plurality of apertures, a horizontally-extending, rod-like structure anchored within one of said apertures and projecting from one side of said strip into the region of said electrical device, said rod-like structure being located adjacent said panel in a position disposed inwardly of the outer edge of said wiring strip, a plurality of circuit wires extending alongside said strip at the other side thereof, at least one of said wires extending through an aperture in said strip and alongside said rod-like structure, means located at points spaced along the length of said rod-like structure for anchoring said one wire to said rod-like structure in engagement with the outer periphery of said rod-like structure, and means for electrically connecting a terminal of said wire to said electrical device.

2. In a panelboard comprising a panel having a mounting surface, at least one electrical device mounted on the panel and projecting from said surface, a wiring strip extending along said surface and having a body portion disposed generally perpendicular to said surface, said body portion containing a plurality of apertures, a horizontally-extending, rod-like structure anchored within one of said apertures and projecting from said grille into the region of said electrical device, said rod-like structure being located adjacent said panel in a position disposed inwardly of the outer edge of said wiring strip, a plurality of circuit wires extending alongside said grille and anchored thereto, at least one of said wires having a portion extending horizontally alongside said rod-like structure, means for anchoring said horizontally-extending wire portion to the outer periphery of said rod-like structure, and means for electrically connecting a terminal of said wire to said electrical device.

3. In a panelboard comprising a panel having a mounting surface, at least one electrical device mounted on the panel and projecting from said surface, a pair of horizontally spaced-apart wiring strips each extending along said surface and having a body portion disposed generally perpendicular to said surface, each of said body portions containing a plurality of apertures, at least some of which are aligned with some of the apertures of the other body portion, a rod-like structure extending horizontally between said two strips inwardly of the outer edges of the two strips and having end portions anchored within a set of aligned apertures in the body portions of the two strips, a plurality of circuit wires extending alongside one of said strips at a side thereof opposite to the location of said electrical device, at least one of said wires extending through an aperture in said strip and alongside said rod-like structure, means located at points spaced along the length of said rod-like structure for anchoring said one wire to the outer periphery of said rod-like structure, and means for electrically connecting a terminal of said wire to said electrical device.

4. In a panel board comprising a panel having a mounting surface, at least one electrical device mounted on the panel and projecting from said surface, a wiring strip extending along said surface and having a body portion disposed generally-perpendicular to said surface, said body portion containing a plurality of apertures, a rod-like structure disposed in a plane generally parallel to said mounting surface and located inwardly of the outer edge of said wiring strip, means secured within one of the apertures of said wiring strip for supporting said rod-like structure in a location near said electrical device, a plurality of circuit wires extending alongside said strip, at least one of said wires extending through an aperture in said strip and alongside said rod-like structure, means for anchoring said one wire to the outer periphery of said rod-like structure, and means for electrically connecting a terminal of said wire to said electrical device.

5. In a panelboard comprising a panel having a mounting surface, at least one electrical device mounted on the panel and projecting from said surface, a wiring strip extending along said surface and having a body portion disposed generally perpendicular to said surface, said body portion containing a plurality of apertures, a horizontally extending rod-like structure located within one of said apertures and projecting from one side of said strip into the region of said electrical device, said rod-like structure being located adjacent said panel in a position disposed inwardly of the outer edge of said wiring strip, fastening means at the end of said rod-like structure acting against said strip for preventing axial movement of said rod-like structure with respect to said strip, a plurality of circuit wires extending alongside said strip at the other side thereof, at least one of said wires extending through an aperture in said strip and alongside said rod-like structure, means located at points spaced along the length of said rod-like structure for anchoring said one wire to said rod-like structure in engagement with the outer periphery of said rod-like structure, and means for electrically connecting a terminal of said wire to said electrical device.

6. In a panelboard comprising a panel having a mounting surface, a wiring strip extending along said surface and having a body portion disposed generally perpendicular to said surface, said body portion containing a plurality of apertures, a rod-like structure anchored within one of said apertures and projecting from one side of said strip generally parallel to said mounting surface, said rod-like structure being located adjacent said panel in a position disposed inwardly of the outer edge of said wiring strip, a plurality of circuit wires extending alongside said strip at the other side thereof, at least one of said wires extending through an aperture in said strip and alongside said rod-like structure, and means located at points spaced along the length of said rod-like structure for anchoring said one wire to the outer periphery of said rod-like structure.

7. In a panelboard comprising a panel having a mounting surface, a wiring strip extending along said surface and having a body portion disposed generally perpendicular to said surface, said body portion containing a plurality of apertures, a horizontally-extending rod-like structure anchored within one of said apertures and projecting from one side of said strip, said rod-like structure being located adjacent said panel in a position disposed inwardly of the outer edge of said wiring strip, a plurality of circuit wires extending alongside said strip and anchored thereto, at least some of said wires having portions extending horizontally alongside said rod-like structure, said rod-like structure being provided in its outer periphery with longitudinally-extending grooves in which said horizontally-extending wire portions are disposed, and fastening means anchoring said horizontally-extending wire portions to said rod-like structure and holding said wire portions in said grooves.

References Cited in the file of this patent

UNITED STATES PATENTS

| | | |
|---|---|---|
| 816,847 | Cook | Apr. 3, 1906 |
| 1,508,258 | Sikma | Sept. 9, 1924 |
| 1,651,953 | Hayden | Dec. 6, 1927 |
| 2,140,376 | Anderson | Dec. 23, 1938 |
| 2,430,378 | Waldron | Nov. 4, 1947 |
| 2,445,198 | Wiseman | July 13, 1948 |
| 2,756,369 | Corrie | Jan. 19, 1953 |

OTHER REFERENCES

Tele-Tech., page 42, February, 1955.